(12) United States Patent
Clark et al.

(10) Patent No.: US 6,245,709 B1
(45) Date of Patent: Jun. 12, 2001

(54) SUPPORTED NI-CU HYDROCONVERSION CATALYST

(75) Inventors: Janet R. Clark; Robert J. Wittenbrink, both of Baton Rouge, LA (US); Stephen M. Davis, Baytown, TX (US); Kenneth L. Riley, Baton Rouge, LA (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 08/918,531

(22) Filed: Aug. 22, 1997

Related U.S. Application Data

(60) Continuation-in-part of application No. 08/670,074, filed on Jun. 25, 1996, now Pat. No. 5,660,714, which is a division of application No. 08/502,338, filed on Jul. 14, 1995, now abandoned.

(51) Int. Cl.[7] .................. B01J 23/40; B01J 23/42
(52) U.S. Cl. .......... 502/326; 502/327; 502/332; 502/335; 502/337; 502/355; 502/439; 502/407; 502/414; 502/415
(58) Field of Search .................. 502/314, 318, 502/326, 315, 323, 327, 331, 332, 335, 337, 355, 439, 407, 414, 415; 585/737, 750

(56) References Cited

U.S. PATENT DOCUMENTS

| | | | |
|---|---|---|---|
| 4,443,329 | * | 4/1984 | Eberly, Jr. et al. ............ 208/111 |
| 4,513,090 | * | 4/1985 | Eberly, Jr. et al. ............ 502/66 |
| 4,837,193 | * | 6/1989 | Akizuki et al. ............ 502/242 |
| 4,939,110 | * | 7/1990 | Sachtler et al. ............ 502/66 |
| 5,273,949 | * | 12/1993 | Chopin et al. ............ 502/238 |
| 5,358,917 | * | 10/1994 | Van Veen et al. ............ 502/66 |
| 5,660,714 | * | 8/1997 | Wittenbrink et al. ............ 208/79 |
| 5,750,819 | * | 5/1998 | Wittenbrink et al. ............ 585/734 |
| 5,756,420 | * | 5/1998 | Wittenbrink et al. ............ 502/313 |

FOREIGN PATENT DOCUMENTS

| | | | |
|---|---|---|---|
| 197 04 875A1 | 8/1997 | (DE) | C01B/37/00 |
| 0532117A1 | 3/1993 | (EP) | B01J/23/42 |
| 0587245A1 | 3/1994 | (EP) | B01J/23/74 |
| 0587246A1 | 3/1994 | (EP) | B01J/23/44 |
| WO97/03750 | 2/1997 | (WO) | B01J/21/12 |

OTHER PUBLICATIONS

Lanh et al, Conversion of Cyclohexane on Ni–(Sb, Pb, Cu)/$Al_2O_3$ Bimetallic Catalysts, Journal of Catalysis 129, pp. 58–66 (1991).

* cited by examiner

Primary Examiner—Steven P. Griffin
Assistant Examiner—Cam N. Nguyen
(74) Attorney, Agent, or Firm—Jay Simon

(57) ABSTRACT

Nickel-copper catalysts supported on an amorphous silica-alumina acidic carrier, preferably containing a binder, and having an iso-electric point of $\geq 6.5$ are used to hydroisomerize paraffins, particularly Fischer-Tropsch paraffins, boiling at 350° F.+ into lighter, more valuable products.

10 Claims, 8 Drawing Sheets

SUPPORTED NI-CU HYDROCONVERSION CATALYST

This is a continuation-in-part of U.S. application Ser. No. 08/670,074 filed Jun. 25, 1996, now U.S. Pat. No. 5,660,714 issued Aug. 26, 1997, which is a divisional of U.S. application Ser. No. 08/502,338 filed Jul. 14, 1995 now abandoned.

FIELD OF THE INVENTION

This invention relates to nickel containing hydroconversion catalysts. More particularly, this invention relates to a bimetallic catalyst wherein the hydrogenolysis activity of a nickel containing catalyst is reduced. Still more particularly, this invention relates to a bimetallic, silica-alumina supported nickel containing catalyst useful in the hydroconversion of hydrocarbon containing feedstocks, particularly waxy products obtained from Fischer-Tropsch hydrocarbon synthesis processes.

BACKGROUND OF THE INVENTION

The use of supported Group VIII metals in hydroconversion processes is well known. Often, these metals are combined with Group VIA metals, e.g., cobalt and molybdenum, on suitable supports for use in hydroconversion processes. Group VIII noble metals, e.g., platinum and palladium, are efficient hydroconversion catalysts, but these metals are also relatively expensive. Consequently, there exists a desire to find non-noble metals or combination thereof that can provide activity, selectivity, and activity maintenance equivalent to that of noble metals, thereby reducing significantly catalyst costs.

SUMMARY OF THE INVENTION

In accordance with this invention, a new bi-functional catalyst for the hydro-conversion of hydrocarbons, particularly waxy hydrocarbons from Fischer-Tropsch hydrocarbon synthesis processes, is provided and comprises a supported non-noble Group VIII metal in conjunction with a Group IB metal, the support containing an acidic component, e.g., an amorphous silica-alumina, having an iso-electric point $\geq 6.5$.

The iso-electric point depends on the relative concent species and the $pK_a$ and $pK_b$ of the surface species. A net charge occurs at the interface between a liquid which is hydrodynamically bound to the particle surface and the bulk fluid. The potential at this interface is the zeta potential. At the iso-electric point, the number of positively and negatively charged species on a surface of a colloidal particle are balanced, and the zeta potential is zero. Iso-electric points are typically measured using a Matec electrokinetic sonic amplitude (ESA) system. In the electrokinetic sonic amplitude effect, an electric field is applied to a colloidal suspension and the resulting sound wave is measured. The magnitude of the signal can be used to measure the charge on the particle surface. While the Matec system is capable of making the electroacoustic measurements, it is generally used in a scanning pH mode to determine the pH at which the iso-electric point occurs. Typically a sample is slurried with deionized water and the initial pH and zeta potential are measured. Then a titration is started, using acid or base, until the point of zero charge occurs. The resulting pH is then reported as the iso-electric point. See, for example, Packs, G. A., Chem Rev. (1965), 65, 177–198 and Hunter, R. J., Zeolite Potential in Colloid Science, Principles and Applications, New York, Academic Press, 1981, and Oja, T., Petersen, G. L., and Cannon, D. W., A Method for Measuring the Electrokinetic Properties of a Solution, U.S. Pat. No. 4,497,207; O'Brien, R. W., Journal of Fluid Mechanics, 190, 71 (1988); Babchin, A. J., Chow, R. S., and Sawatzky, R. P., Advances in Colloid and Interface Science, III, 30 (1989); James, Michael, Hunter, Robert J., and O'Brien, Richard W., Langmuir, 8, (1992).

The presence of the Group IB metal is believed to mitigate the excessive hydrogenolysis and cracking activity of Group VIII metals, e.g., nickel, which produce excessive amounts of undesirable naphtha and $C_4^-$ gases. Thus, the bifunctionality of hydrogenation and isomerization is maximized while hydrogenolysis and cracking activity is minimized. The preferred metals are nickel and copper.

The acidic support is preferably an amorphous silica-alumina and preferably contains a binder. The alumina content of the silica-alumina material is usually present in amounts of less than 30 wt %, preferably 5 to <30 wt %, more preferably 10–20 wt % of the silica-alumina component. Suitable binder materials include both amorphous and crystalline inorganic oxides, such as alumina, silica, clays, magnesia, titania, zirconia, and mixtures thereof. Preferred binders are silica and alumina, alumina being particularly preferred. Preferred alumina binders include reforming grade alumina such as a gamma alumina, having a relatively high surface area, e.g., $\geq 100$ m$^2$/gm. When an alumina binder is incorporated into the support, an amount $\geq 20\%$ by weight of total support is preferred, more preferably $\geq 25$ wt %, and still more preferably $\geq 28$ wt %, and up to about 50 wt %.

Current speculation is that the binder assists in dispersing the nickel component of the catalyst, and that the binder increases the iso-electric point of the support as a whole.

In a particularly preferred embodiment the alumina concentration of the support, including binder, ranges from about 30–60 wt %, preferably 35–55 wt %, and more preferably 35 to 50 wt %.

DESCRIPTION OF PREFERRED EMBODIMENTS

Figure 1:
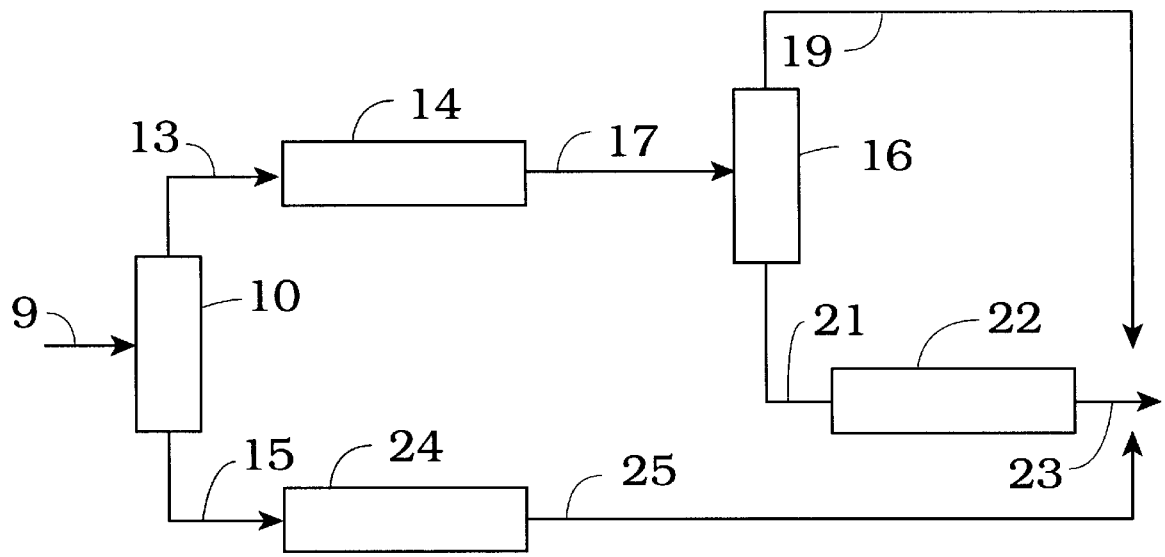
FIG. 1 is a schematic for the processing of Fischer-Tropsch waxes using a supported cobalt-molybdenum catalyst in accordance with U.S. Pat. No. 5,378,348.

Characteristics of the support preferably include surface areas of 200–500 m$^2$/gm (BET method), preferably about 250–400 m$^2$/gm; and pore volume of less than 1 ml/gm as determined by water adsorption, preferably in the range of about 0.35 to 0.8 m/gm, e.g., 0.57 ml/gm.

The preparation of conventional synthetic amorphous silica-alumina microspheres has been described in: Ryland, Lloyd B., Tamele, Microslav W., and J. Norton Wilson. "Cracking Catalysts." Catalysis: Volume VII. Ed. Paul H. Emmett. New York: Reinhold Publishing Corporation, 1960, pp. 5–9.

In order to use this material in a fixed bed reactor, it is mixed with a binder such as alumina or silica to form a wet paste and fed to a screw transport system and eventually emerges through dies constituting an end plate in an extruder. This end plate can have holes in the shape of circles, ovals, three-lobed joined rings, and four-lobed joined rings. A typical barrel auger type extruder is one manufactured by Welding Engineers.

The metals may be incorporated onto the support by any suitable method, and the incipient wetness technique is preferred. Suitable metal solutions may be used, such as nickel nitrate, copper nitrate or other aqueous soluble salts. Preferably, the metals are co-impregnated onto the support allowing for intimate contact between the Group VIII metal and the Group IB metal, for example, the formation of bimetallic clusters. The impregnated support is then dried, e.g., over night at about 100–150° C., followed by calcination in air at temperatures ranging from about 200–550° C., preferably 350–550° C., so that there is no excessive loss of surface area or pore volume.

Group VIII metal concentrations of less than about 15 wt % based on total weight of catalyst, preferably about 1–12 wt %, more preferably about 1–10 wt % can be employed. The Group IB metal is usually present in lesser amounts and may range from about a 1:2 to about a 1:20 ratio respecting the Group VIII metal.

More preferred catalyst characteristics are shown below:

| | |
|---|---|
| Ni, wt % | 2.5–3.5 |
| Cu, wt % | 0.25–0.35 |
| $Al_2O_3$-$SiO_2$, % | 65–75 |
| $Al_2O_3$ (binder), % | 25–35 |
| Surface Area, $m^2/g$ | 290–325 |
| Total Pore Volume (Hg), ml/g | 0.35–0.45 |
| Compacted Bulk Density, g/ml | 0.58–0.68 |
| Avg. Crush Strength | 3.0 min. |
| Loss on Ignition (1 hour @ 550° C.), % wt. | 3.0. max. |
| Abrasion loss @ 0.5 hr, wt % | 2.0 max. |
| Fines, wt % thru 20 mesh | 1.0 max. |

In a specific embodiment of this invention the use of the aforementioned hydroconversion catalyst allows for an improvement in the processing of Fischer-Tropsch waxy products. Thus, in U.S. Pat. No. 5,378,348, there is disclosed a process whereby the product of a hydrocarbon synthesis process is separated into lighter, 500° F.– and heavier, 500° F.+ streams for treatment, the heavier stream being subjected to hydroisomerization with a silica-alumina supported cobalt-molybdenum catalyst. The stream separation is necessitated by the fact that this catalyst does not affect waxy product boiling below about 500° F. When jet fuel products are desired, normal paraffins in the jet fuel range can significantly and deleteriously affect the freeze point specification. The separation of product into fractions boiling above and below about 500° F. and the separate treatment of these fractions adds significantly to the cost and complexity of upgrading Fischer-Tropsch hydrocarbons.

However, because of the activity of the catalysts described in this invention, 350° F.+ material can be hydroisomerized with these new catalysts. Consequently, the need to separate out the 350° F.+ hydrotreated fractions from the 500° F.– fraction is eliminated.

Turning for a moment to the drawings, FIG. 1 is a simplified schematic based on U.S. Pat. No. 5,378,348. In this scheme a waxy product, for example, a Fischer-Tropsch product in line 9 is sent to fractionator 10 wherein the product is separated into a lighter, 500° F.– fraction in line 13 and a heavier 500° F.+ fraction in line 15. The lighter fraction is subjected to hydrotreating in hydrotreater 14. The product of the hydrotreater in line 17, after flashing $C_5$– products is separated in fractionator 16 into a $C_5$–350° F. cut in line 19 and a 350° F.+ cut in line 21 which is then subjected to hydroisomerization in reactor 22.

The heavier 500° F.+ fraction in line 15 is subjected to hydroisomerization without any prior chemical or catalytic treatment, in reactor 24, the product being recovered in line 25. The products of lines 19, 23, and 25 may be combined in any way to produce jet fuels or other distillates as may be required.

The hydrotreating and hydroisomerization catalysts and conditions are fully described in U.S. Pat. No. 5,378,348 the disclosure of which is incorporated herein by reference.

Figure 2:
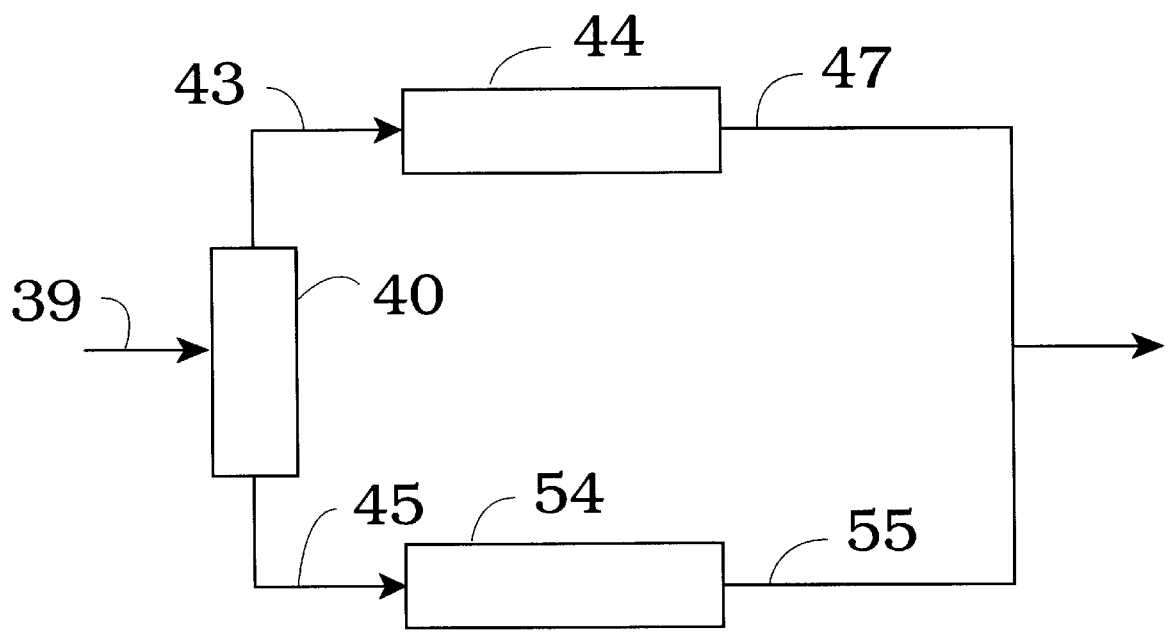
FIG. 2 is a schematic for the simplified processing of Fischer-Tropsch waxes using the catalyst of this invention.

FIG. 2 is a simplified schematic of the upgrading of a Fischer-Tropsch wax in accordance with this invention and using the catalysts of this invention. The waxy feed in line 39 is sent to fractionator 40 where the feed is separated into a lighter product, preferably the entire liquid product, $C_5$–350° F., or a $Cs_5$–320° F.+ product, and a heavier product, 320° F.+, preferably 350° F.+, in lines 43 and 45, respectively. The lighter product is hydrotreated in hydrotreater 44, the product, after $C_5$– flashing, recovered in line 47. The heavier product in line 45 is treated by hydroisomerization in accordance with the catalysts of this invention, i.e., nickel-copper on an amorphous silica-alumina support, reactor 54, the product being recovered in line 55. The products in lines 47 and 55 may then be combined for jet fuels or other desired distillates. Clearly, the flow plan in FIG. 2 is less complex than that of FIG. 1 and a fractionator (16) and light fraction hydroisomerization unit (22) are eliminated.

Thus, the catalyst for hydrotreating, i.e., the removal of any hetero-atom compounds, the lighter fraction may be any suitable catalyst, therefor, and preferably contains a Group VIII noble or non-noble metal, or Group VI metals or a combination thereof, supported on refractory oxides or zeolites, e.g., alumina, silica, silica-alumina, preferably alumina. Hydrotreating conditions include temperatures of 350–600° F., pressures of 100–3000 psig, and hydrogen consumption rates of 200–800 SCF/B.

Hydroisomerization is carried out at conventional conditions, and the feed is not limited to Fischer-Tropsch products. Thus, the feed can comprise any 320° F.+ or 350° F.+ fraction that can be upgraded in product value by hydroisomerization, e.g., any feed containing significant amounts of normal paraffins.

Hydroisomerization is a well known process and the conditions for carrying out the process may vary widely. Generally, however, some broad and preferred conditions are shown in the table below:

|                              | Broad Range | Preferred Range |
| ---------------------------- | ----------- | --------------- |
| Temperature, ° F.            | 300–800     | 650–750         |
| Pressure, psig               | 0–2500      | 500–1200        |
| Hydrogen Treat Rate, SCF/B   | 500–5000    | 2000–4000       |
| Hydrogen Consumption Rate, SCF/B | 50–500  | 100–300         |

Preferred feeds to the hydroisomerization are those containing significant amounts of normal paraffins, e.g., greater than about 40% normal paraffins, and particularly normal paraffins obtained from Fischer-Tropsch processes, e.g., having normal paraffins in excess of 80%, preferably in excess of 90%, more preferably in excess of 95%, and still more preferably in excess of 98% paraffins, a typical product slate which may vary by +10% for each fraction, from Fischer-Tropsch process liquids being

| IBP–320° F.   | 13 wt % |
| 320–500° F.   | 23 wt % |
| 500–700° F.   | 19 wt % |
| 700–1050° F.  | 34 wt % |
| 1050° F.+     | 11 wt % |

The Fischer-Tropsch process can produce a wide variety of materials depending on catalyst and process conditions. Currently, preferred catalysts include cobalt, ruthenium, and iron, most preferably cobalt. Cobalt and ruthenium make primarily paraffinic products, cobalt tending towards a heavier product slate, e.g., containing $C_{20}+$, while ruthenium tends towards more distillate-like paraffins, e.g., $C_5$–$C_{20}$.

The following examples will further serve to illustrate this invention are should not be considered as limiting the invention in any way.

EXAMPLE 1

An amorphous silica-alumina catalyst support, designated support A, and having an iso-electric point of 6.95 was prepared using the following procedure:

a) 210 g of an Akzo silica-alumina with surface area of 517 $m^2$/g, pore volume ($N_2$) of 0.55 mL/g, $Na_2O$ wt. % of 0.05, $SiO_2$ wt. % of 87.85 and $Al_2O_3$ wt. % of 12.85 is blended with 500 g of deionized water.

b) This mixture is blended with 2 kg of a 4.5 wt % reforming grade alumina (gamma alumina) solution.

c) A 1:1 by weight concentrated ammonium hydroxide solution is added to the above mixture and the gel-like material is stirred for 10 minutes.

d) This material is air-dried at 130° C. for 24 hrs.

e) The dry material is ball-milled for 18 hrs., then mulled and extruded to 1.3 mm quadrilobes.

f) The extrudates are air-dried at room temperature, forced air-dried at 110° C. for three hrs., and then calcined in air for 2 hrs. at 538° C. The total alumina content was 39.5 wt %.

EXAMPLE 2

A catalyst containing Pd on support A was prepared by the following procedure:

a) 7.05 grams of 10 wt % tetraaminepalladium (II) nitrate solution is dissolved in appropriate amount deionized water for use in impregnating support A.

b) 50 grams of support A (as prepared in Example 1) are added to above solution and mixed until all solids are wet.

c) The catalyst, was air dried, dried for 4 hrs. in forced-air oven at 127° C. and then calcined for two hours at 538° C.

EXAMPLE 3

A catalyst NiCu/support A was prepared by the following procedure:

a) 7.7 grams of nickel nitrate and 0.6 grams of copper nitrate are dissolved in appropriate amount deionized water as to impregnate the support.

b) 50 grams of support A (as prepared in Example 1) are added to above solution and mixed until all solids are wet.

c) The catalyst was air dried, dried for 4 hrs. in forced-air oven at 127° C. and then calcined for two hours at 538° C.

EXAMPLE 4

A catalyst Pd/support B was prepared by the following procedure:

a) 7.05 grams of 10 wt % tetraaminepalladium (II) nitrate solution dissolved in appropriate amount deionized water as to impregnate the support.

b) 50 grams of support B, having an iso-electric point of 5.31 supplied by UOP were added to above solution and mixed until all solids are wet.

c) The catalyst was air-dried, dried for 4 hrs. in forced-air oven at 127° C. and then calcined for two hours at 538° C. The total alumina content of the support B was 40.5 wt %.

EXAMPLE 5

A catalyst NiCu/support B was prepared by the following procedure:

a) 7.7 grams of nickel nitrate and 0.6 grams of copper nitrate are dissolved in appropriate amount deionized water as to impregnate the support.

b) 50 grams of support B supplied by UOP were added to above solution and mixed until all solids are wet.

c) The catalyst was air dried, dried for 4 hrs. in forced-air oven at 127° C. and then calcined for two hours at 538° C.

EXAMPLE 6

A Fischer-Tropsch wax feed was converted to liquid products via a mild hydrocracking/hydroisomerization step utilizing bi-functional catalysts consisting of nickel (3.0 wt %) and copper (0.3 wt %) on two different silica-alumina acidic supports, supports A & B as described in Examples 3 and 5. In each case, the metals were added via co-impregnation using standard incipient wetness techniques. Prior to evaluation each catalyst was crushed and sized to 14/35 mesh. The hydroconversion runs were carried out in a small up flow pilot plant. The catalysts were evaluated at 750 psig hydrogen pressure with a nominal treat rate of 2500 SCF/B at 1.0 LHSV. The degree of 700° F.+ conversion was varied by adjusting the reactor temperature. The boiling point distribution of the F-T wax feed is shown in Table 1. The conditions for the reaction are summarized in Table 2 and were sufficient to provide between 10–80% 700° F.+ conversion where 700° F.+ conversion is defined.

700° F.+ Conv.=[1−(wt % 700° F.+ in product)/(wt % 700° F.+ in feed)]×100

TABLE 1

| | |
|---|---|
| IBP–320° F. | 2.3 |
| 320–500° F. | 10.3 |
| 500–700° F. | 34.7 |
| 700–1050° F. | 46.5 |
| 1050° F+ | 6.2 |

TABLE 2

| | |
|---|---|
| Temperature Range, ° F. (° C.) | 600–630 (316–332) |
| $H_2$ Pressure, psig (pure) | 750 |
| $H_2$ Treat Gas Rate, SCF/B | 2500 |
| LHSV, v/v/h | 1.0 |

Figure 3:
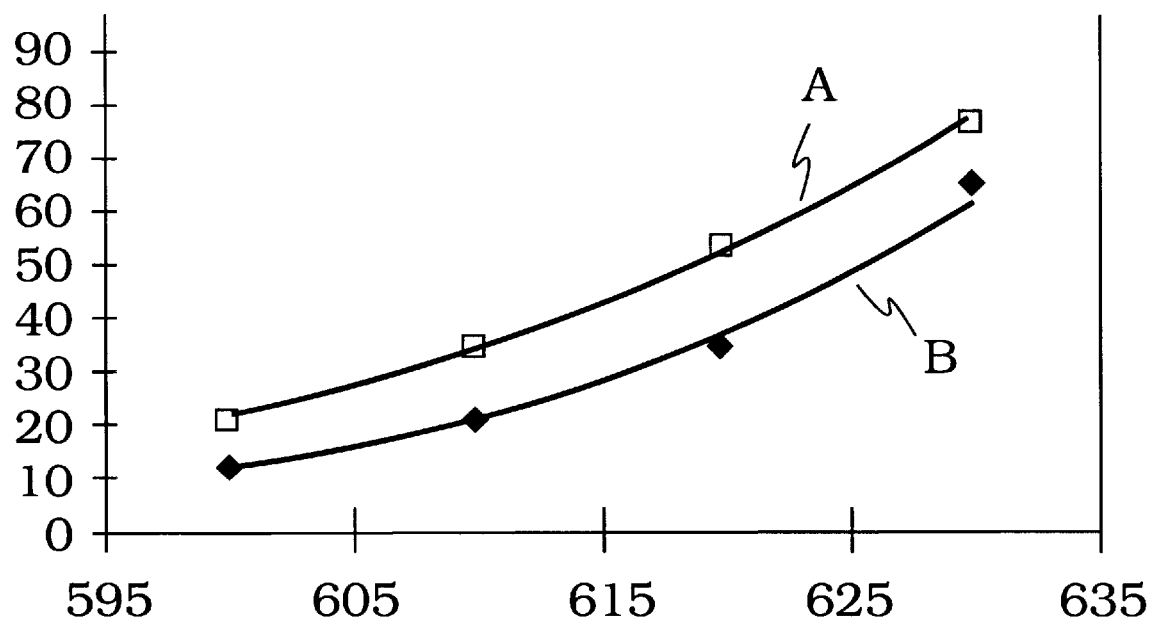
FIG. 3 shows catalyst activity for nickel/copper catalysts on supports A & B as a formation of 700° F. conversion (%), ordinate, and temperature, ° F., abscissa.

Table 3 contains data showing the % 700° F.+ conversion and product weight percent yields. These data clearly show that the supports do not give similar results with nickel and copper metals. At the same 700° F.+ conversion the catalyst with support A has higher selectivity towards the desired, distillate products than Catalyst with support B. For example, at 34% 700° F.+ conversion, the Catalyst with support B makes significantly more $C_1$–$C_4$, $C_5$–320° F., and less 320–500° F. product. In addition, the Catalyst with support A has significantly higher activity than the Catalyst with support B which is illustrated graphically in FIG. 3.

TABLE 3

| Catalyst | NiCu/A | NiCu/A | NiCu/A | NiCu/A |
|---|---|---|---|---|
| Reactor Temperature, ° F. | 600 | 610 | 620 | 630 |
| 700° F.+ Conversion, wt % | 22.2 | 34.7 | 53.1 | 76.4 |
| Yields, wt % | | | | |
| $C_1$–$C_4$ | 1.05 | 1.51 | 2.61 | 4.44 |
| $C_5$–320° F. | 7.38 | 10.27 | 15.50 | 24.71 |
| 320–500° F. | 14.70 | 17.21 | 21.31 | 27.55 |
| 500–700° F. | 35.84 | 36.60 | 35.88 | 31.14 |
| 700° F.+ | 41.03 | 34.41 | 24.71 | 12.15 |

| Catalyst | NiCu/B | NiCu/B | NiCu/B | NiCu/B |
|---|---|---|---|---|
| Reactor Temperature, ° F. | 600 | 610 | 620 | 630 |
| 700° F.+ Conversion, wt % | 13.04 | 21.04 | 34.42 | 64.71 |
| Yields, wt % | | | | |
| $C_1$–$C_4$ | 0.96 | 1.57 | 3.24 | 9.28 |
| $C_5$–320° F. | 6.87 | 9.08 | 14.20 | 27.68 |
| 320–500° F. | 12.69 | 14.01 | 15.25 | 17.60 |
| 500–700° F. | 33.71 | 33.72 | 32.21 | 26.85 |
| 700° F.+ | 45.77 | 41.61 | 34.56 | 18.60 |

EXAMPLE 7

Figure 4:
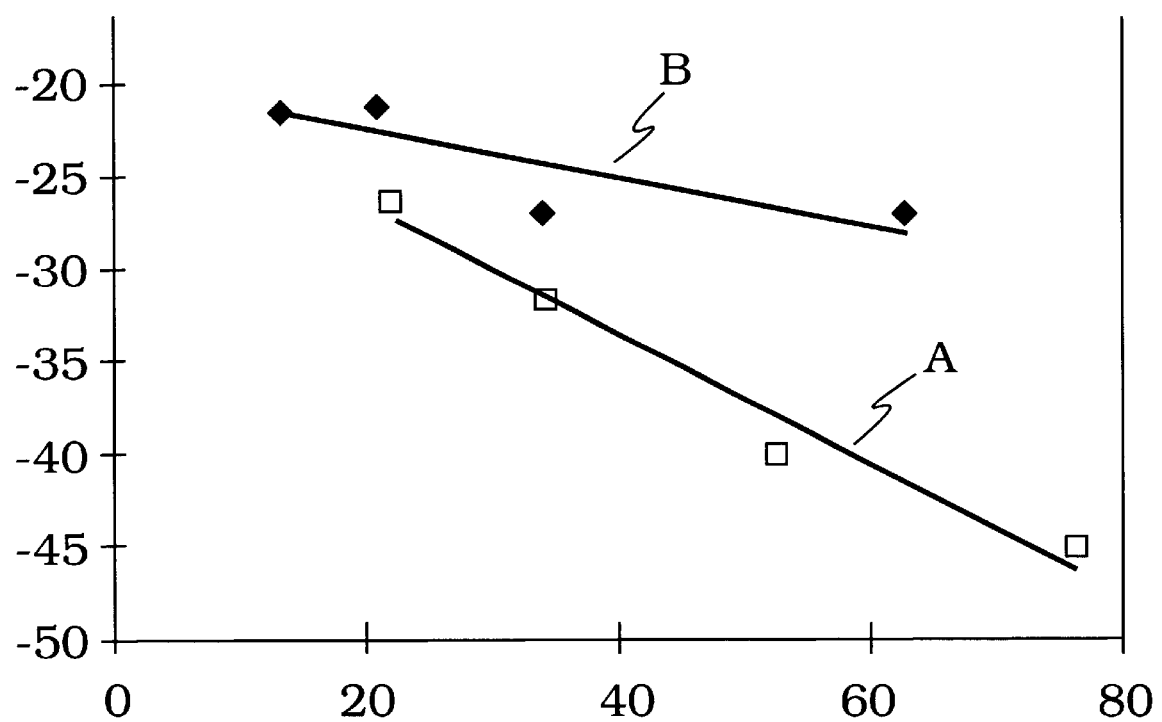
FIG. 4 shows jet freeze, ° C., ordinate, v. 700° F. conversion for the same catalysts as in FIG. 3.
Figure 5:
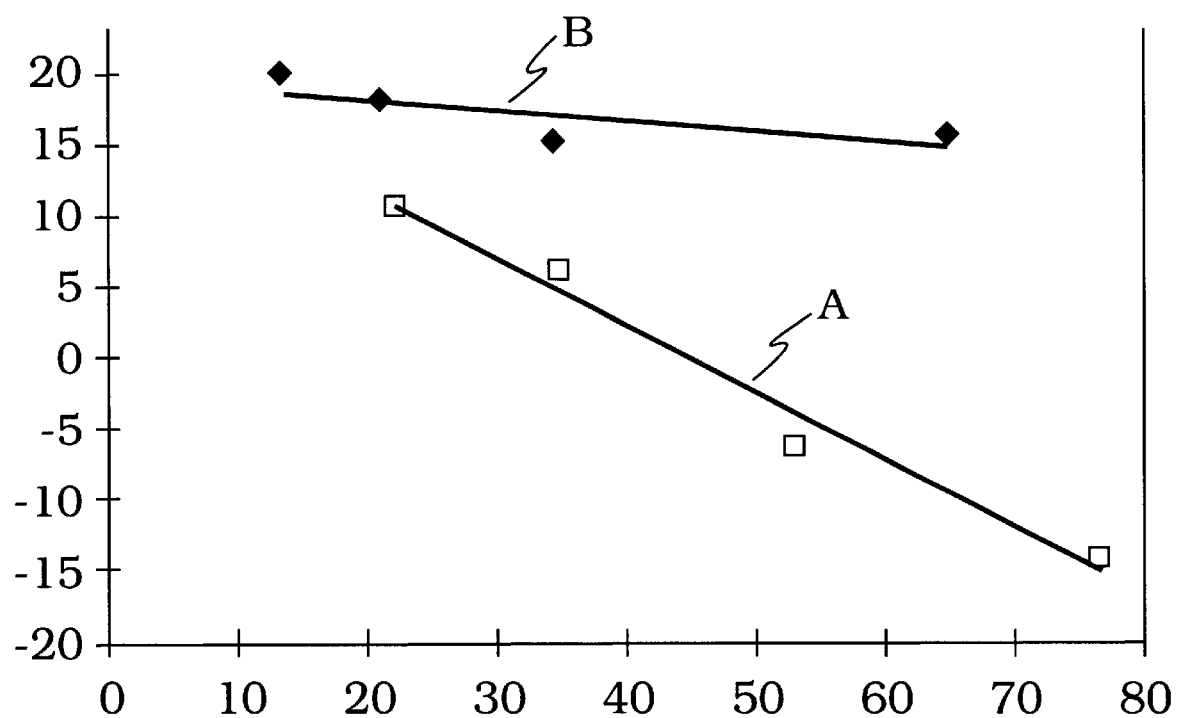
FIG. 5 shows cloud point, ° C., ordinate v. % 700° F. conversion, abscissa for the same catalysts as in FIG. 3.

The total liquid products from Example 6 were fractionated using a standard 15/5 distillation into four fractions: $C_5$–320° F., 320–500° F., 500–700° F., and 700° F. The 320–500° F. and 500–700° F. cuts were analyzed to determine their low temperature properties. Table 4 lists the freeze points of the 320–500° F. cut while Table 5 lists the cloud points of the 500–700° F. cut. From the freeze point and cloud point data (see FIGS. 4 & 5), it is clear that the Catalyst with support A produces far superior low temperature properties in the products than does the Catalyst with support B.

TABLE 4

| Catalyst | % HI Conv. | Freeze Pt, ° C. |
|---|---|---|
| NiCu/A | 22.15 | −26.21 |
| NiCu/A | 34.7 | −31.52 |
| NiCu/A | 53.12 | −39.77 |
| NiCu/A | 76.39 | −44.79 |
| NiCu/B | 13.04 | −21.24 |
| NiCu/B | 21.04 | −20.99 |
| NiCu/B | 34.42 | −26.83 |
| NiCu/B | 64.71 | −26.7 |

TABLE 5

| Catalyst | % HI Conv. | Cloud Pt, ° C. |
|---|---|---|
| NiCu/A | 22.15 | 10.7 |
| NiCu/A | 34.7 | 6.3 |
| NiCu/A | 53.12 | −5.8 |
| NiCu/A | 76.39 | −13.7 |
| NiCu/B | 13.04 | 19.8 |
| NiCu/B | 21.04 | 18 |
| NiCu/B | 34.42 | 15 |
| NiCu/B | 64.71 | 15.8 |

EXAMPLE 8

A Fischer-Tropsch wax feed was converted to liquid products via a mild hydrocracking/hydroisomerization step utilizing bi-functional catalysts containing palladium (0.5 wt %) on two different silica-alumina acidic supports, A and B, described in Examples 2 and 4, respectively. In each case, the metals were added via co-impregnation using standard incipient wetness techniques. Prior to evaluation each catalyst was crushed and sized to 14/35 mesh. The hydroconversion runs were carried out in a small up flow pilot plant. The catalysts were evaluated at 750 psig hydrogen pressure with anominal treat rate of 2500 SCF/B at 1.0 LHSV. The degree of 700° F.+ conversion was varied by adjusting the reactor temperature. The boiling point distribution of the Fischer-Tropsch wax feed is given in Table 6. The conditions for the reaction are summarized in Table 7 and were sufficient to provide between 20–70% 700° F.+ conversion where 700° F.+ conversion is defined as above.

Thus supports A&B both contained essentially the same total wt % alumina, 39.5 and 40.5 wt %, respectively, but had different iso-electric points, 6.95 and 5.31, respectively. Clearly, the catalyst prepared with the higher iso-electric point produced products of significantly better quality.

TABLE 6

| | |
|---|---|
| IBP–320° F. | 2.3 |
| 320–500° F. | 10.3 |
| 500–700° F. | 34.7 |
| 700–1050° F. | 46.5 |
| 1050° F.+ | 6.2 |

TABLE 7

| | |
|---|---|
| Temperature Range, ° F. (° C.) | 600–630 (316–332) |
| $H_2$ Pressure, psig (pure) | 750 |
| $H_2$ Treat Gas Rate, SCF/B | 2500 |
| LHSV, v/v/h | 1.0 |

Figure 6:
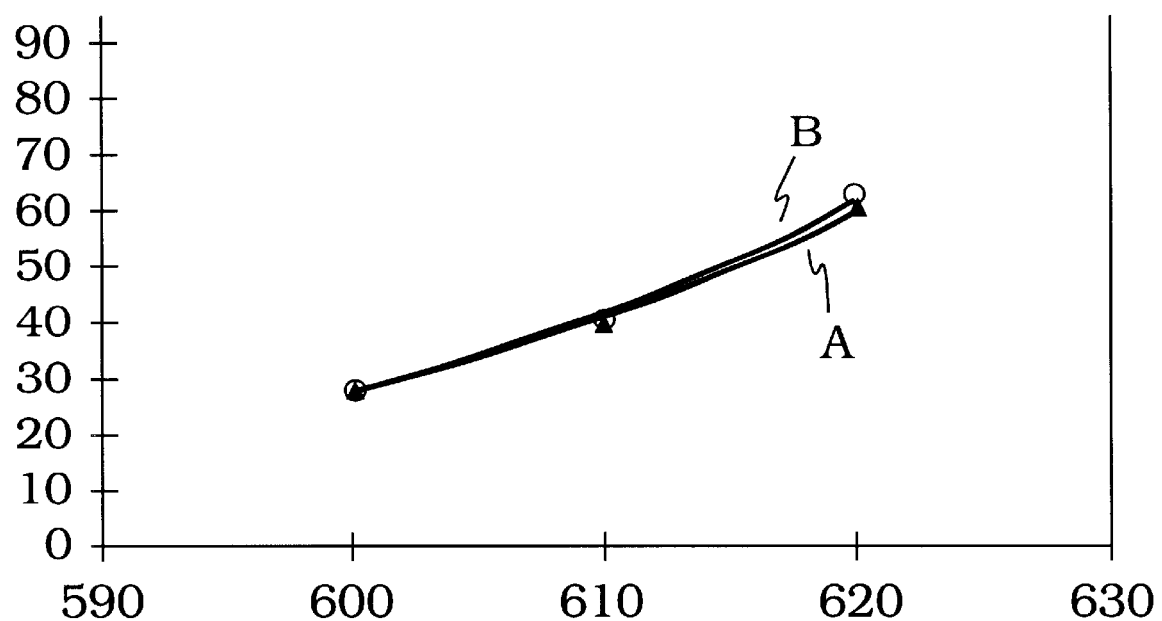
FIG. 6 is the same as FIG. 3, catalyst activity, with catalysts having Pd on each of supports A and B.

Table 8 contains the data showing the % 700° F. conversion and product weight percent yields. These data clearly show that the two supports display very similar activity and selectivity with palladium metal loading. At the same 700° F.+% conversion, such as 28% and 40%, both catalysts give approximately the same product weight percent yields. FIG. 6 also clearly illustrates the similarity in activity of the catalysts.

TABLE 8

| Catalyst | Pd/A | Pd/A | Pd/A |
|---|---|---|---|
| Reactor Temperature, ° F. | 600 | 610 | 620 |
| 700° F.+ Conversion, wt % | 27.88 | 39.66 | 57.31 |
| Yields, wt % | | | |
| $C_1$–$C_4$ | 0.94 | 1.56 | 2.39 |
| $C_5$-320° F. | 7.10 | 10.28 | 15.46 |
| 320–500° F. | 16.36 | 19.07 | 24.94 |
| 500–700° F. | 37.59 | 37.29 | 36.15 |
| 700° F.+ | 38.01 | 31.80 | 21.05 |

| Catalyst | Pd/B | Pd/B | Pd/B |
|---|---|---|---|
| Reactor Temperature, ° F. | 600 | 610 | 620 |
| 700° F.+ Conversion, wt % | 27.99 | 40.03 | 62.31 |
| Yields, wt % | | | |
| $C_1$–$C_4$ | 1.26 | 1.59 | 2.27 |
| $C_5$-320° F. | 9.04 | 11.03 | 15.65 |
| 320–500° F. | 15.95 | 18.89 | 25.29 |
| 500–700° F. | 35.8 | 36.88 | 36.93 |
| 700° F.+ | 37.95 | 31.6 | 19.86 |

EXAMPLE 9

Figure 7:
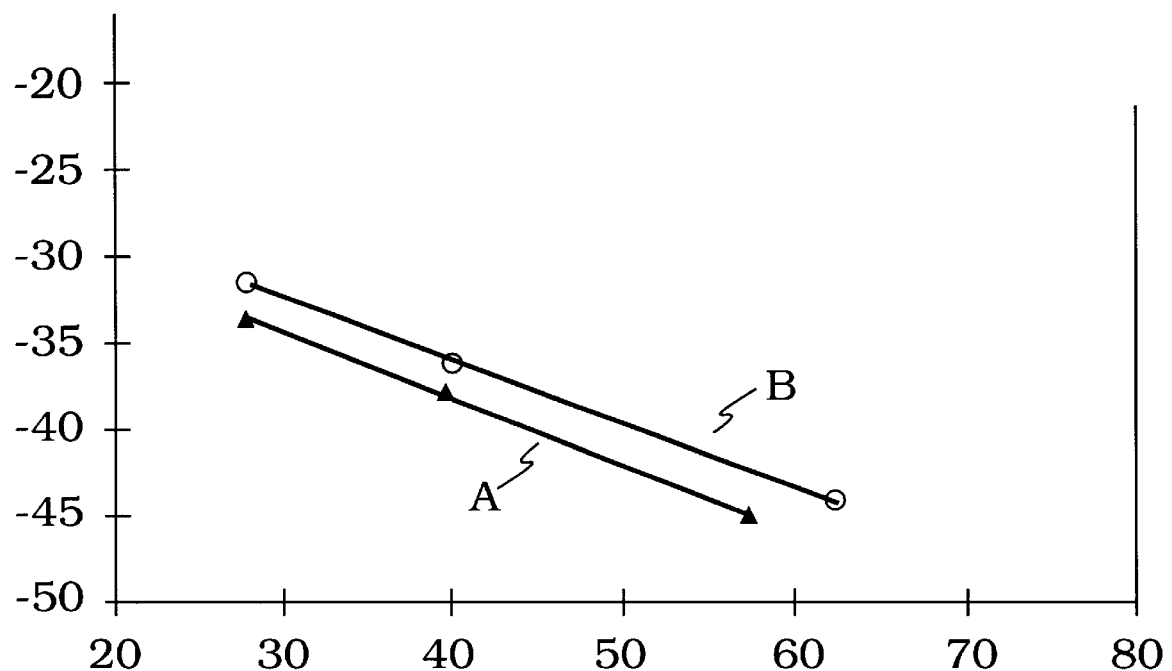
FIG. 7 is the same as FIG. 4, jet freeze v. % 700° F. conversion for the same catalysts as in FIG. 6.
Figure 8:
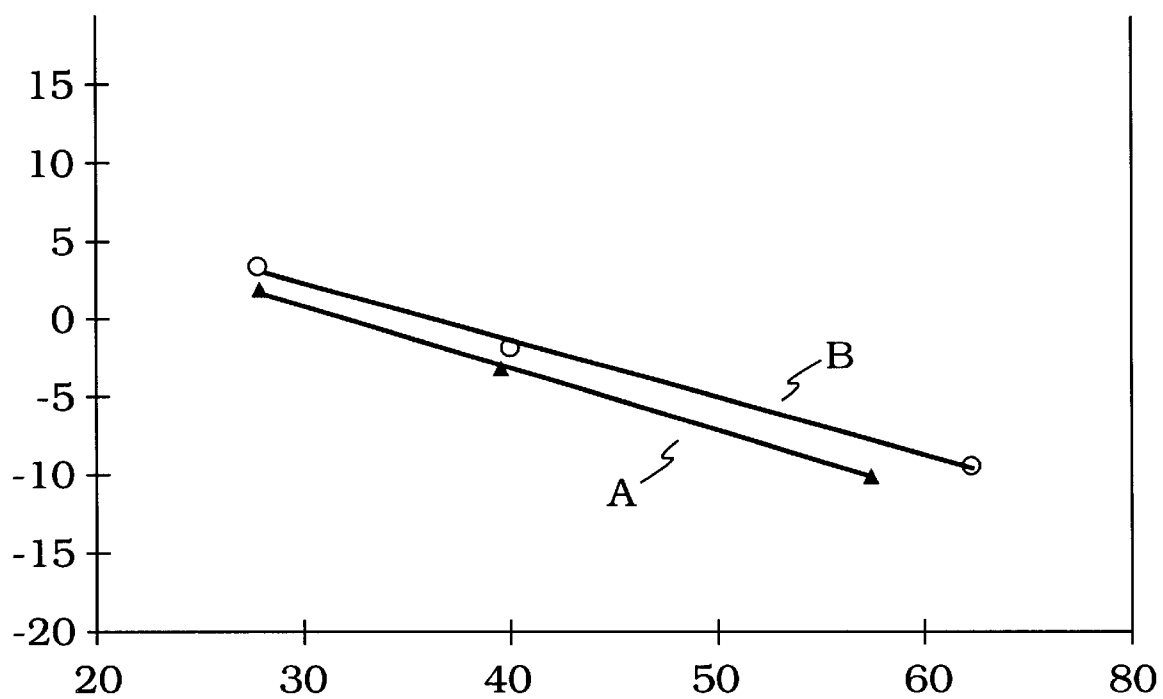
FIG. 8, is the same as FIG. 5, cloud point v. % 700° F. conversion for the same catalysts as in FIG. 6.

The total liquid products from Example 8 were fractionated using a standard 15/5 distillation into four fractions: $C_5$-320°F., 320–500° F., 500–700° F., and 700° F., The 320–500° F. and 500–700° F. cuts were analyzed to determine their low temperature properties. Table 9 lists the freeze points of the 320–500° F. cut while Table 10 lists the cloud points of the 500–700° F. cut. From the freeze point and cloud point data (see FIGS. 7 & 8), it is clear that the products from the two palladium-loaded supports have very similar low temperature properties.

TABLE 9

| Catalyst | % HI Conv. | Freeze Pt, ° C. |
|---|---|---|
| Pd/A | 27.88 | −33.56 |
| Pd/A | 39.66 | −37.91 |
| Pd/A | 57.31 | −45.34 |
| Pd/A | 27.99 | −31.52 |
| Pd/B | 40.03 | −36.15 |
| Pd/B | 62.31 | −44.35 |

TABLE 10

| Catalyst | % HI Conv. | Freeze Pt, ° C. |
|---|---|---|
| Pd/A | 27.88 | 2 |
| Pd/A | 39.66 | −3 |
| Pd/A | 57.31 | −10.1 |
| Pd/B | 27.99 | 3.5 |
| Pd/B | 40.03 | −1.6 |
| Pd/B | 62.31 | −9.3 |

These examples clearly show that with a noble metal, e.g., Pd, the supports, A and B, are essentially equal regarding activity and product quality. However, as shown above, the supports, A and B, with non-noble metals, e.g. nickel and copper, show significant differences regarding activity and product quality.

We claim:

1. A hydroconversion catalyst comprising nickel and copper in catalytically effective amounts on a support, the support containing an amorphous silica-alumina, the alumina content of the silica-alumina being less than about 30 wt %, and the support has an iso-electric point of ≧6.5 and a pore volume of less than about 1.0 ml/g.

2. The catalyst of claim 1 wherein the nickel is less than about 15 wt %, the copper: nickel ratio is less than about 1:2 and the support has a surface area greater than about 200 m²/g.

3. The catalyst of claim 2 wherein the catalyst contains a binder.

4. The catalyst of claim 3 wherein the binder is selected from the group consisting of silica, alumina, and mixtures thereof.

5. The catalyst of claim 4 wherein the binder is alumina and the binder is present in an amount of at least about 20 wt % of the support.

6. The catalyst of claim 5 wherein the alumina binder is a gamma alumina having a surface area in excess of 100 m²/g.

7. The catalyst of claim 5 wherein the total alumina content of the support ranges between about 30 to 60 wt % of the support.

8. The catalyst of claim 5 wherein the alumina binder is gamma alumina and the binder is present in an amount of at least about 24 wt % of the support.

9. The catalyst of claim 8 wherein the total alumina content of the support ranges between about 35 to 55 wt % of the support.

10. The catalyst of claim 1 wherein the nickel is present in amounts of about 1–12 wt %, and the copper:nickel ratio ranges from about 1:2 to 1:20.

* * * * *